United States Patent [19]
Kuriki

[11] Patent Number: 5,302,796
[45] Date of Patent: Apr. 12, 1994

[54] WIRE-CUT ELECTRICAL DISCHARGE MACHINE HAVING WIRE ELECTRODE CUTTING DEVICE

[75] Inventor: Kazuteru Kuriki, Nishikasugai, Japan

[73] Assignee: Brother Kogyo Kabushiki Kaisha, Nagoya, Japan

[21] Appl. No.: 990,245

[22] Filed: Dec. 14, 1992

[30] Foreign Application Priority Data

Jan. 27, 1992 [JP] Japan ............................ 4-12248

[51] Int. Cl.$^5$ .................................................. B23H 7/10
[52] U.S. Cl. ................................................ 219/69.12
[58] Field of Search ........................... 219/69.12, 69.17

[56] References Cited

U.S. PATENT DOCUMENTS

| | | | |
|---|---|---|---|
| 4,816,636 | 3/1989 | Obara et al. | 219/69.12 |
| 4,818,848 | 4/1989 | Obara et al. | 219/69.12 |
| 4,877,935 | 10/1989 | Aso et al. | 219/69.12 |
| 4,980,531 | 12/1990 | Gambin | 219/69.12 |
| 5,077,457 | 12/1991 | Onaka et al. | 219/69.12 |
| 5,130,508 | 7/1992 | Umetsu et al. | 219/69.12 |

FOREIGN PATENT DOCUMENTS

| | | | |
|---|---|---|---|
| 63-120034 | 5/1988 | Japan | 219/69.12 |
| 63-123632 | 5/1988 | Japan | 219/69.12 |
| 9108854 | 6/1991 | PCT Int'l Appl. | 219/69.12 |

*Primary Examiner*—Geoffrey S. Evans
*Attorney, Agent, or Firm*—Oliff & Berridge

[57] ABSTRACT

A wire cutting mechanism for smoothly cutting a broken cutting wire of a wire electrode cutting device that positively guides the scrape position of the wire electrode to a disposal passage. The cutting mechanism has a feed mechanism positioned above a wire cutter to control the feed of the wire electrode during the cutting operation. Both the cutter and the feed mechanism are mounted on a plate that is displaceable in order to align the wire electrode feed with the disposal passage when the wire electrode has been broken and must be cut to ensure accurate feeds the cutting zone. The cutting mechanism, when positioned for cutting, feeds the broken end of the electrode wire for a predetermined time so that the wire electrode enters the disposal passage prior to cutting.

21 Claims, 10 Drawing Sheets

Fig.6B

| ITEM | INSTRUCTIONS |
|---|---|
| S1 | INITIALIZATION |
| S2 | ELECTRICAL DISCHARGE MACHINING |
| S3 | WIRE ELECTRODE BROKEN OFF? |
| S4 | REWIND WIRE ELECTRODE |
| S5 | OFF SIGNAL OUTPUT FROM SENSOR? |
| S6 | STOP DRIVING MOTOR |
| S7 | TURN ON THIRD SOLENOID |
| S8 | TURN ON FIRST SOLENOID AND DRIVE FEEDING MOTOR |
| S9 | START TIMER |
| S10 | TIME PERIOD T1 LAPSE? |
| S11 | STOP FEEDING MOTOR |
| S12 | TURN ON SECOND SOLENOID |
| S13 | OFF SIGNAL OUTPUT FROM SENSOR? |
| S14 | TURN OFF THIRD SOLENOID |

Fig.8B

| ITEM | INSTRUCTIONS |
|---|---|
| S31 | INITIALIZATION |
| S32 | ELECTRICAL DISCHARGE MACHINING |
| S33 | WIRE ELECTRODE BROKEN OFF? |
| S34 | REWIND WIRE ELECTRODE |
| S35 | OFF SIGNAL OUTPUT FROM SENSOR? |
| S36 | STOP DRIVING MOTOR |
| S37 | TURN ON THIRD SOLENOID |
| S38 | TURN ON FIRST SOLENOID AND DRIVE TRANSMITTING MOTOR |
| S39 | START TIMER |
| S40 | TIME PERIOD T1 LAPSE? |
| S41 | STOP TRANSMITTING MOTOR |
| S42 | TURN ON FOURTH SOLENOID AND DRIVE FEEDING MOTOR |
| S43 | TURN ON SECOND SOLENOID AND TURN ON SOLENOID VALVE |
| S44 | OFF SIGNAL OUTPUT FROM SENSOR? |
| S45 | START TIMER |
| S46 | TIME PERIOD T2 LAPSE? |
| S47 | TURN OFF FIRST SOLENOID, TURN OFF SECOND SOLENOID, TURN OFF THIRD SOLENOID, TURN OFF FOURTH SOLENOID, TURN OFF SOLENOID VALVE AND STOP FEEDING MOTOR |

WIRE-CUT ELECTRICAL DISCHARGE MACHINE HAVING WIRE ELECTRODE CUTTING DEVICE

BACKGROUND OF THE INVENTION

1. Field of the Invention

The invention relates to a wire-cut electrical discharge machine having a wire electrode cutting device capable of cutting off a predetermined length of a wire electrode, which is broken by an accident, in order to dispose of the unusable length before rethreading the wire electrode.

2. Description of the Related Art

In the wire-cut electrical discharge machine, electrical discharge pulses are supplied in a machining zone between a wire electrode and a workpiece in order to cut a complex shape from the workpiece. In such a wirecut electrical discharge machine, there is a need to forcibly cut off the wire electrode in two cases when the wire electrode is not broken. For example, in the first case after one workpiece is safely cut and a new workpiece is set, the wire electrode is forcibly cut off. Then, it is easier to position the wire electrode in a starting position for cutting the new workpiece. The second case when the wire electrode needs to be forcibly cut off is when there is one pattern comprising some parts disposed independently each other. To cut out the pattern from the workpiece, first, one part is cut out from the workpiece and then, to cut out a next part from the workpiece, the wire electrode is forcibly cut off. As a result, it is easier to position the wire electrode in a starting position for the next part.

As mentioned above, the electrical discharge pulses are supplied in the machining zone between the wire electrode and the workpiece, so that the pattern is cut out from the workpiece. However, if the electrical discharge repeatedly occurs in the same position of the wire electrode, there is the possibility that the wire electrode will break. Upon the accidental breakage of the wire electrode, a predetermined length of the wire electrode must be cut off before the wire electrode is rethreaded Especially, when the wire electrode breaks by accident, the breaking point of the wire electrode (the pointed head of the wire electrode) or the periphery thereof is usually deformed by the electrical discharges occurring in the machining zone between the wire electrode and the workpiece. As a result, it is difficult to put the pointed head of the wire electrode, resulting from the deformation, into the small wire guide of the wire-cut electrical discharge machine, or into the starting position on the workpiece, that is, it is difficult to rethread the wire electrode in the wire-cut electrical discharge machine.

Therefore, in the wire-cut electrical discharge machine, a predetermined length of the deformed wire electrode is cut off and scrapped. Then, since the wire electrode is smoothly cut at the pointed head, it is easy to introduce the wire electrode into the wire guide so that the wire electrode is rethreaded in the wire-cut electrical discharge machine. Especially, in the case where the wire-cut electrical discharge machine is continuously operated for a long time without an operator, it is preferable that the operation of cutting off and disposing of the unusable length of the broken wire electrode and the operation of rethreading the wire electrode are automatically executed. Various types of wire electrode cutting device capable of automatically executing the above-mentioned operations are disclosed in the art.

One type of wire electrode cutting device is the wire electrode cutting device disclosed in Japanese Laid-Open Patent Publication No. 63-11232. According to the wire electrode cutting device so disclosed, the pointed head of the broken-down wire electrode is held by a clamp (holding means) and the wire electrode is cut off at the wire electrode supply side with respect to the pointed head. After cutting, a driving device lifts and rotates the clamp holding the scrap wire electrode such that the clamp is positioned above a disposal box. When the clamp opens, to release the wire electrode, the scrap wire electrode falls into a disposal box. However, when the clamp opens, the wire electrode does not always release from the clamp. In other words, the operation of disposing of the wire electrode is not always executed with certainty.

Moreover, according to the wire electrode cutting device disclosed in U.S. Pat. No. 4,698,478, the wire electrode to be cut is drawn between a brake device and a clamp device. The brake device is used to give a back tension to the wire electrode, upstream of the feeding direction of the wire electrode, while machining. The rolling-type clamp device is disposed above the workpiece. The drawn wire electrode is cut off by a cutting device disposed above the clamp device and the scrap wire around the clamp is pushed off such as to fall in a disposal chute.

According to the above-described structure, the pointed head of the broken-down wire electrode is wound around the clamp device so as to be drawn tight. Therearound fore, after the wire electrode is cut off, the scrap wire electrode is tightly wound around the clamp device. As a result, it is very difficult to push the bundle of scrap wire from the clump device. Further, a scrap wire push-off disposal device becomes very complex.

In addition, in the above-mentioned wire electrode cutting device, after the unusable length of the wire electrode is cut off, the scrap wire electrode is carried above the disposal box. Therefore, it takes a lot of time to cut off and dispose of the wire electrode. As a result, the wire electrode is not speedily rethreaded and working efficiency is reduced.

SUMMARY OF THE INVENTION

It is therefore an object of the invention to provide a wire-cut electrical discharge machine, capable of certainly and speedily cutting off and disposing of the unusable length of a broken-down wire electrode, having a simple structure.

To achieve the above-mentioned object, the wire-cut electrical discharge machine comprises: a wire guide which is disposed between a supply of the wire electrode and a workpiece and which introduces the wire electrode into a processing passage in which the wire electrode moves toward the workpiece; a cutting means which is disposed between the supply of the wire electrode and the workpiece and which cuts off the unusable length of the wire electrode; a disposal portion for storing a scrap wire electrode which is cut off by the cutting means; and a moving means for moving selectively the wire guide toward the processing passage or toward the disposal passage in which the scrap wire electrode moves to the disposal portion.

According to the invention, since the wire guide is faced to the disposal passage by the moving means, the scrap wire electrode is introduced into the disposal portion with certainty.

BRIEF DESCRIPTION OF THE DRAWINGS

A preferred embodiment of the invention will be described in detail with reference to the following figures wherein:

FIG. 6B is table of labels for the steps of the flowchart of FIG. 6A;

FIG. 8B is a table of labels for the steps of the flowchart of FIG. 8A.

DETAILED DESCRIPTION OF THE PREFERRED EMBODIMENT

Hereinafter, an embodiment of the invention will be explained with reference to FIGS. 1 through 7.

Figure 1:
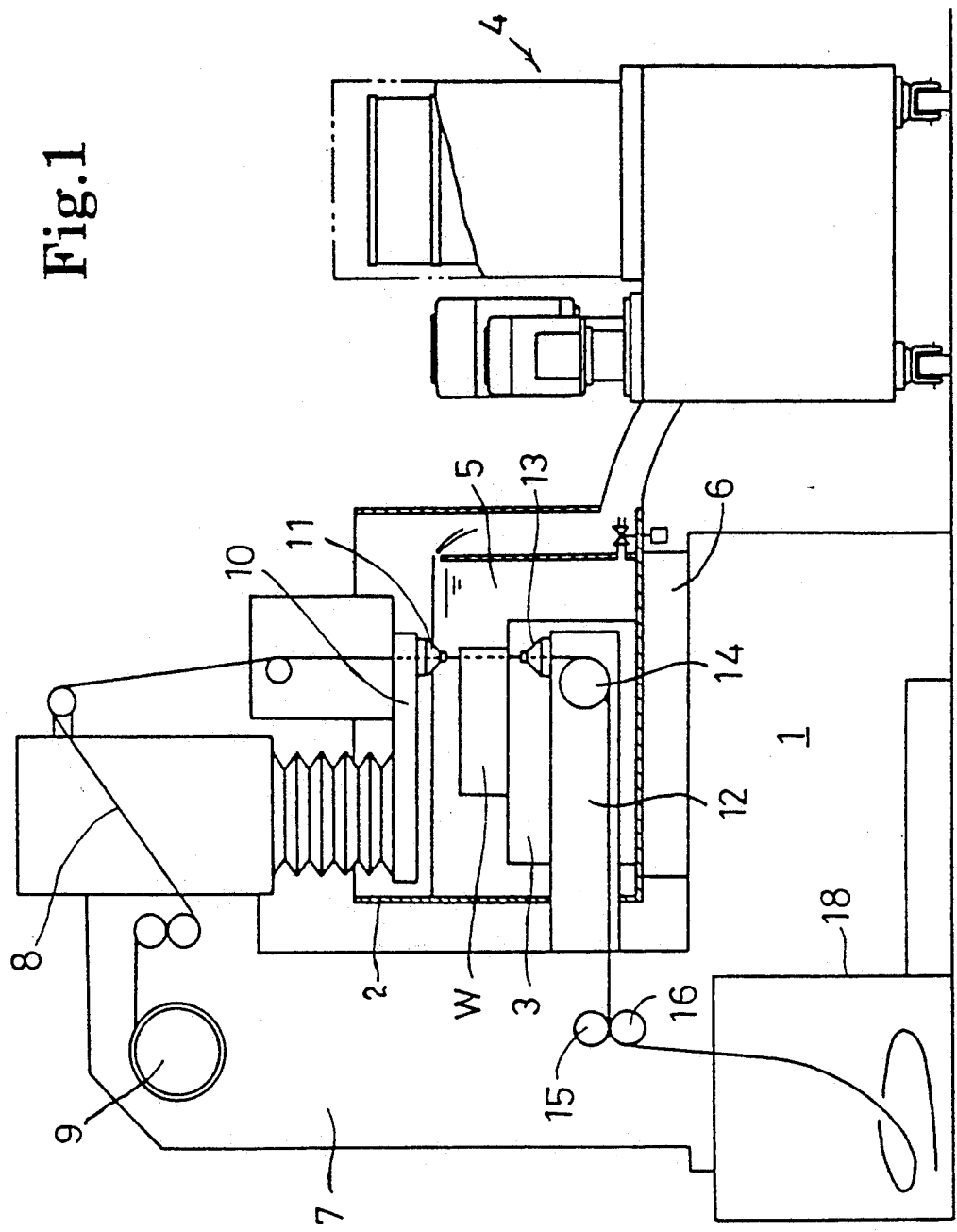
FIG. 1 is a schematic side view of a wire-cut electrical discharge machine.

As shown in FIG. 1, in the wire-cut electrical discharge machine, a work tank 2 is set on a base 1 through a X-Y feed table 6. In the work tank 2, a workpiece W is put on a work table 3 which is fixed into the work tank 2. The X-Y feed table 6 is driven by a driving device (not shown) so that, the workpiece W is moved with the work tank 2. The work tank 2 is flooded with machining fluid 5 having an insulative property (fresh water or fluid mixed with fresh water and oil). The machining fluid 5 is supplied into the work tank 2 from a machining fluid supplying device 4 in a known manner described below. While machining, the machining fluid 5 gets polluted. Therefore, the polluted machining fluid 5 is returned from the work tank 2 to the machining fluid supplying device 4, again in a known manner, where the polluted machining fluid 5 is cooled and passed through a filter and is again supplied to the work tank 2.

A wire bobbin 9, on which a wire electrode 8 is wound, is disposed in the upper portion of a column 7. An upper nozzle 11 is disposed under an upper arm 10 which is supported by the column 7. A lower nozzle 13 is provided on a lower arm 12 which is supported on the lower portion of the column 7. The wire electrode 8, which is pulled from the wire bobbin 9, is disposed longitudinally from the upper nozzle 11 toward the lower nozzle 13 through the workpiece W. When electrical discharge pulses are supplied to the wire electrode 8 and the workpiece W by a power supply (not shown), electrical discharges occur in a small space (machining zone) between the wire electrode 8 and the workpiece W so that the workpiece W is cut.

To supply the machining fluid 5 to the work tank 2 from the machining fluid supplying device 4, the machining fluid 5 is jetted from at least one side of the upper nozzle 11 and the lower nozzle 13 toward the machining zone. As a result, metal dust, which is generated while machining, is removed and the machining zone is cooled. The wire electrode 8 is a fine line. A common wire electrode 8 has a diameter of about 0.05 mm-0.3 mm. Moreover, the feeding speed (moving speed) of the wire electrode 8 is changed according to the machining condition and the thickness of the workpiece W. For example, when the workpiece W to be cut is 50 mm thick, the feeding speed is 100-300 mm/second.

Figure 2:
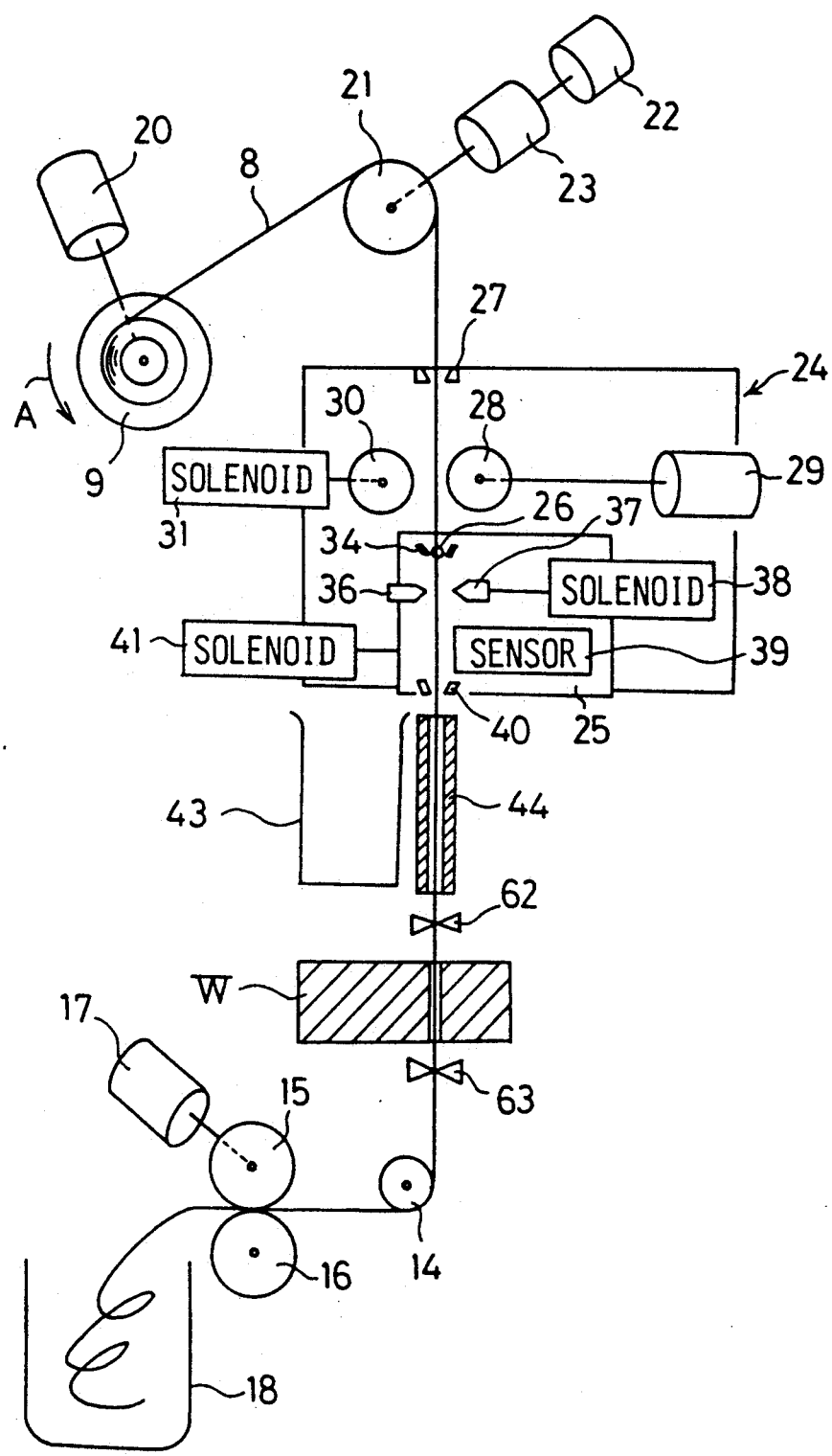
FIG. 2 is a main portion, partial sectional side view of the wire electrode cutting disposal portion.

A guide pulley 14 is disposed below the lower nozzle 13. After the feeding direction of the used wire electrode 8 is changed toward a substantially horizontal direction by the guide pulley 14, the wire electrode 8 is held between a pair of rollers 15 and 16 so as to be forcibly fed to a receiving box 18. The roller 15 is driven so as to rotate by a receiving motor 17 as shown in FIG. 2.

The supplying device for supplying the wire electrode 8 will be explained with reference to FIGS. 2 through 4. The wire bobbin 9 rotates in a positive direction (counter to arrow A) to feed the wire electrode 9 downward while machining. However, a driving motor 20 applies a torque to the wire bobbin 9 to cause the wire bobbin 9 to try to rotate in a negative, or reverse, direction. A pulley 21, which produces a braking force as a result of connection to a magnetic brake 23, is disposed between the wire bobbin 9 and the workpiece W. U.S. patent application Ser. No. 07/874,017, filed Apr. 17, 1992, discloses such a reverse torque applied to the wire bobbin and the braking of the pulley. The disclosure of U.S. patent application Ser. No. 07/874,017 is incorporated by reference. Therefore, while machining, the wire electrode 8, between the wire bobbin 9 and the pulley 21, has applied thereto a pretension. The main tension is applied to the wire electrode 8 between the pulley 21 and the rollers 15, 16. Therefore, when the wire electrode 8 breaks, the wire electrode 8 is rewound onto the wire bobbin 9. A rotational sensor 22, for detecting the rotation of the pulley 21, is connected to the magnetic brake 23.

Figure 3:
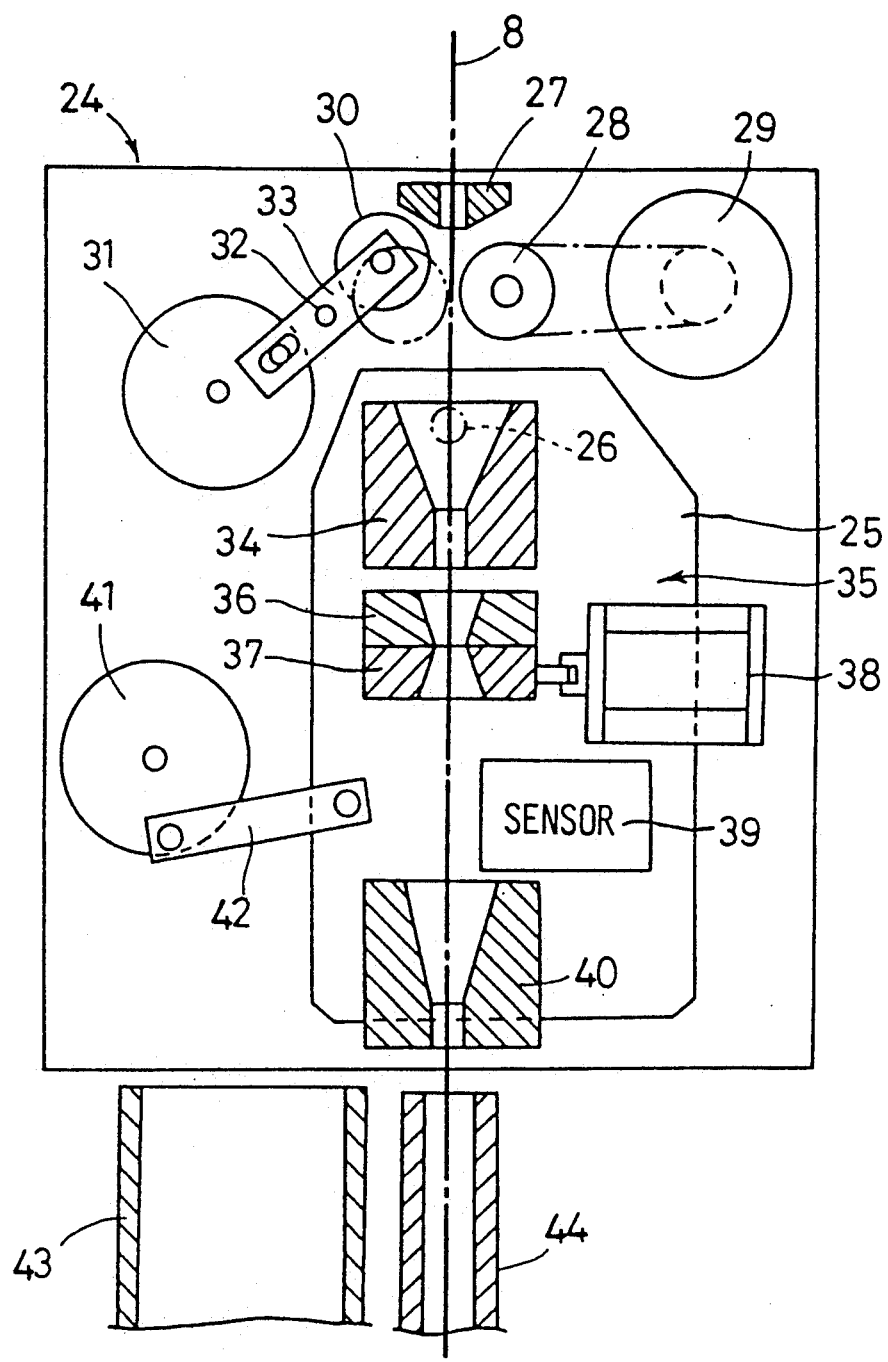
FIG. 3 shows the condition of a moving plate while machining.
Figure 4:
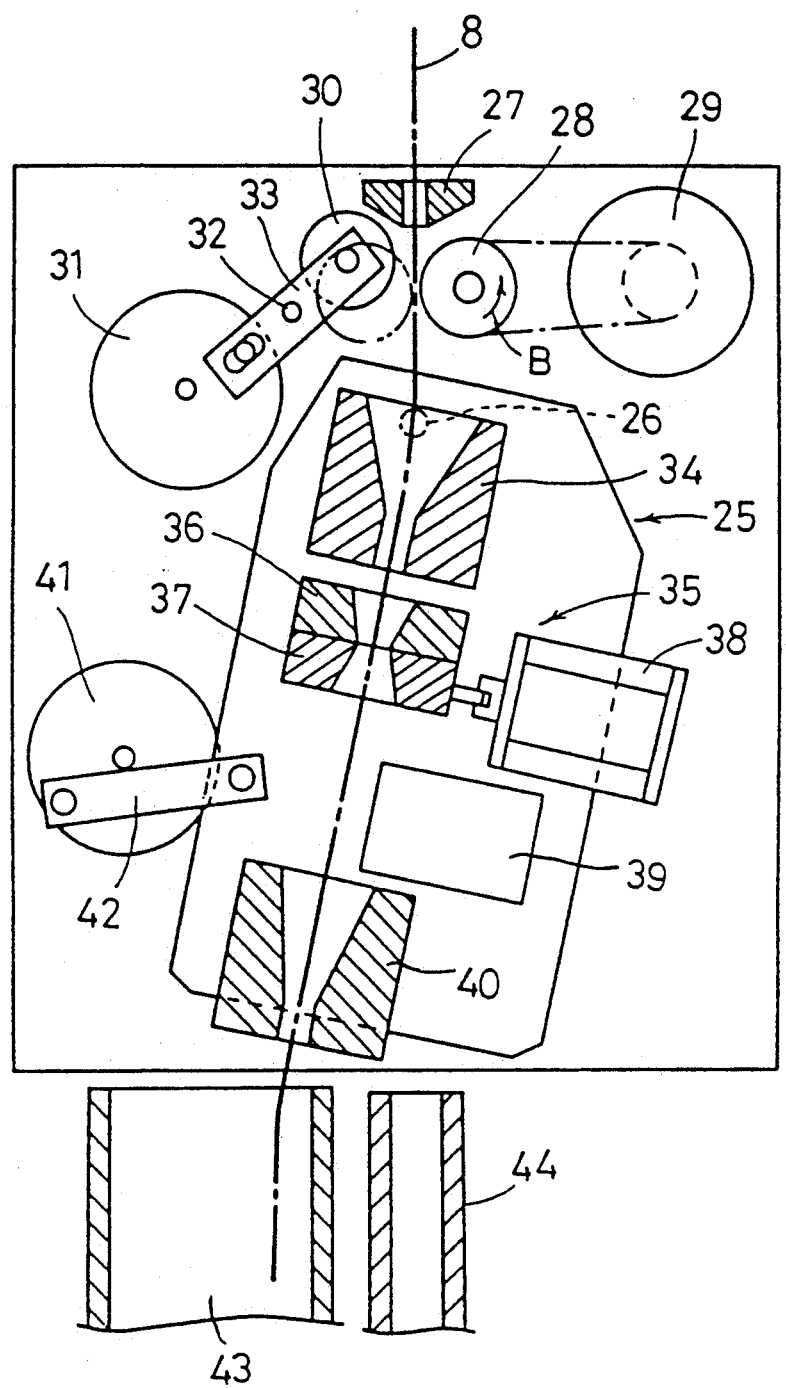
FIG. 4 shows the condition of the moving plate while cutting and disposing of a wire electrode.

As shown in FIG. 3, a moving plate 25 is supported by a fixed frame 24 so as to be able to pivot about a shaft 26 which is disposed on the upper portion of the moving plate 25. A wire guide 27 is disposed on the frame 24 above the shaft 26. Disposed on the frame 24 below the wire guide 27 is a feeding roller 28. The feeding roller 28 is rotated by a transmitting motor 29, a step motor, through a transmission mechanism having an endless belt.

A lever 33 is disposed on the frame 24 so as to rotate about a supporting shaft 32. A pinch roller 30 is disposed on one end of the lever 33 in an opposing relationship with the feeding roller 28. The other end of the lever 33 is connected to a rotational plate of a first solenoid 31. When the coil of the first solenoid 31 is excited, the rotational plate of the first solenoid 31 rotates through a predetermined angle so that the pinch roller 30 is brought into contact with the feeding roller 28 via the lever 33 rotating about the supporting shaft 32. As a result, the wire electrode 8 is held between the pinch roller 30 and the feeding roller 28 and the feeding roller 28 is rotated by the transmitting motor 29 in order to feed the wire electrode 8 downward.

When the coil of the rotational first solenoid 31 is turned off, the plate is turned in a reverse direction to be returned its original position by a spring which is built into the first solenoid 31. As a result, the pinch roller 30 separates from the feeding roller 28. Thus, an upper wire electrode driving device comprises the feeding roller 28, the transmitting motor 29, the pinch roller 30, the lever 33 and the first solenoid 31.

Mounted on the moving plate 25 is a wire guide 34 that is disposed in the vicinity of the shaft 26. A cutting device 35, provided on the moving plate 25, comprises a cylindrical stationary knife 36 which is fixed to the moving plate 25 below the wire guide 34, a cylindrical moving knife 37 is disposed below the stationary knife 36 so as to move reciprocately in a substantially horizontal direction, and a linear second solenoid 38 for driving the moving knife 37. When the moving knife 37 is moved by the second solenoid 38, the wire electrode 8 passing from the stationary knife 36 to the moving knife 37 is cut off. When the second solenoid 38 is turned off, the moving knife 37 is returned to its original position under the influence of a spring (not shown).

A sensor 39 for detecting the wire electrode 8 is disposed on the moving plate 25 below the cutting device 35. Below the sensor 39 is a lower wire guide 40 that is fixed onto the lower portion of the moving plate 25. As described below, even if the wire electrode 8 is broken by accident, the pointed head of the wire electrode 8 exists between the pair of wire guides 34 and 40. Therefore, the sensor 39 can detect the existence of the wire electrode 8 with certainty.

A rotational third solenoid 41 is connected to the moving plate 25 through a lever 42 and sways the moving plate 25 from side to side about the shaft 26. When the coil of the rotational third solenoid 41 is excited, the rotational plate of the third solenoid 41 rotates through a predetermined angle so that the lever 42 is pulled in a first direction. Then, as shown in FIG. 4, the moving plate 25 pivots centering on the shaft 26 such that the lower opening of the lower wire guide 40, disposed on the lower portion of the moving plate 25, faces to the upper opening of a disposal box 43 as a disposal portion for the wire electrode 8. In this position, the scrap wire electrode 8 is introduced into a disposal passage.

When the coil of the third solenoid 41 is turned the rotational plate is returned to its original position by a spring (not shown) which is built into the third solenoid 41. Then, as shown in FIG. 3, the moving plate 25 returns to the position where the lower opening of the lower wire guide 40 faces to the upper opening of a cylindrical guide 44 disposed adjacent to the disposal box 43. The guide 44 introduces the wire electrode 8 toward the upper guide 62 for machining.

As mentioned above, whenever the third solenoid 41, as the moving means, is driven, the moving plate 25 is moved between being over the processing passage or the disposal passage. The processing passage is selected while machining so that the wire electrode 8 is introduced into the upper guide 62. On the other hand, when the unusable length of the wire electrode 8 is cut off, the disposal passage is selected so that the scrap wire electrode 8 is introduced into the disposal box 43.

Figure 5:
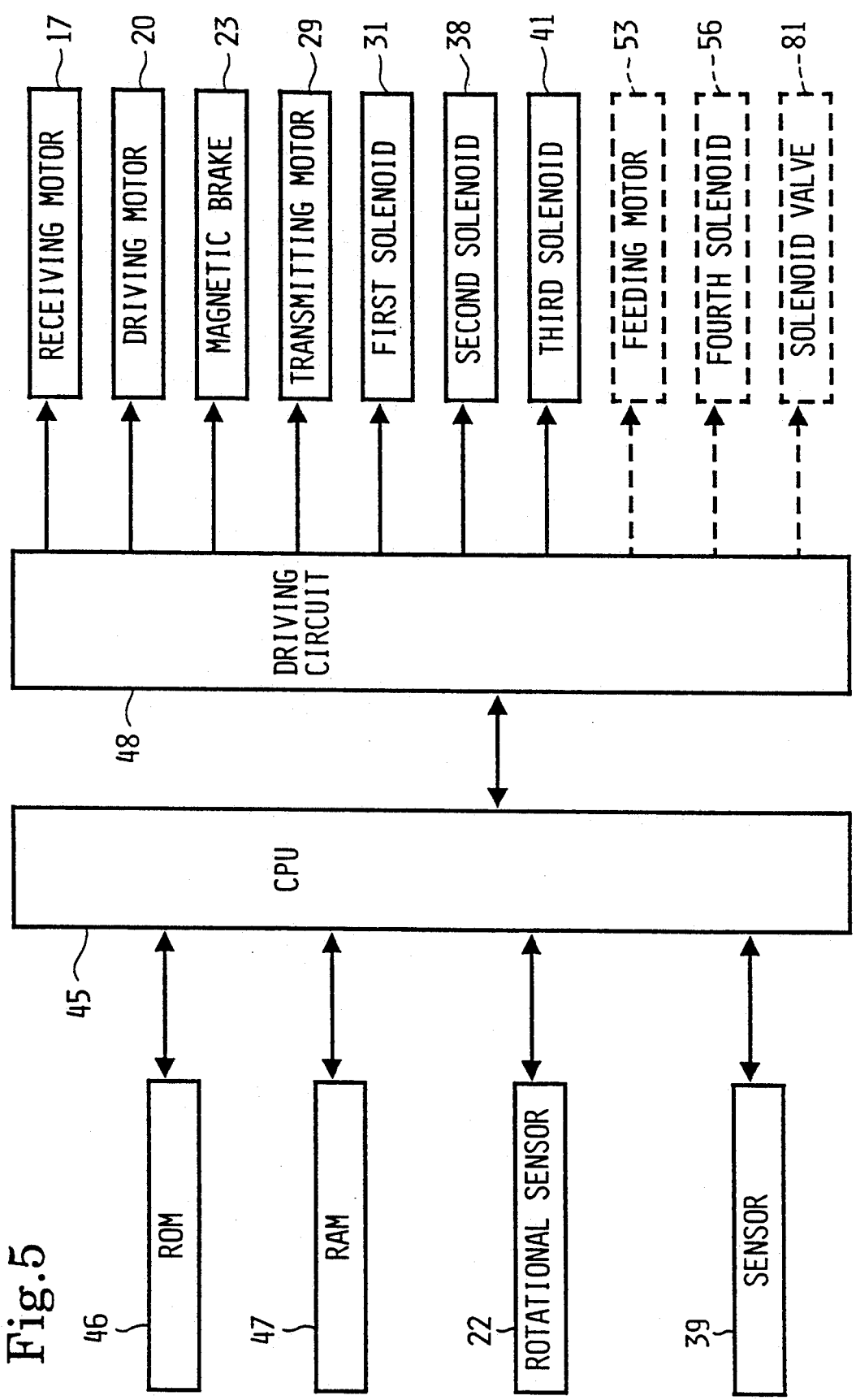
FIG. 5 is a block diagram of a control device.

As shown in FIG. 5, the control device of the wire-cut electrical discharge machine comprises a central processing unit (CPU) 45, a read only memory (ROM) 46 for storing a control program for the wire-cut electrical discharge machine and a control program for cutting and disposing of the wire electrode 8, a random access memory (RAM) 47 for temporarily storing various data, and an interface (not shown). The sensor 39, for detecting the wire electrode, and a rotational sensor 22 are connected to the CPU 45, respectively. Further, the receiving motor 17, the driving motor 20, the magnetic brake 23, the transmitting motor 29, the first solenoid 31, the second solenoid 38 and the third solenoid 41 are respectively connected to the CPU 45.

Figure 6A:
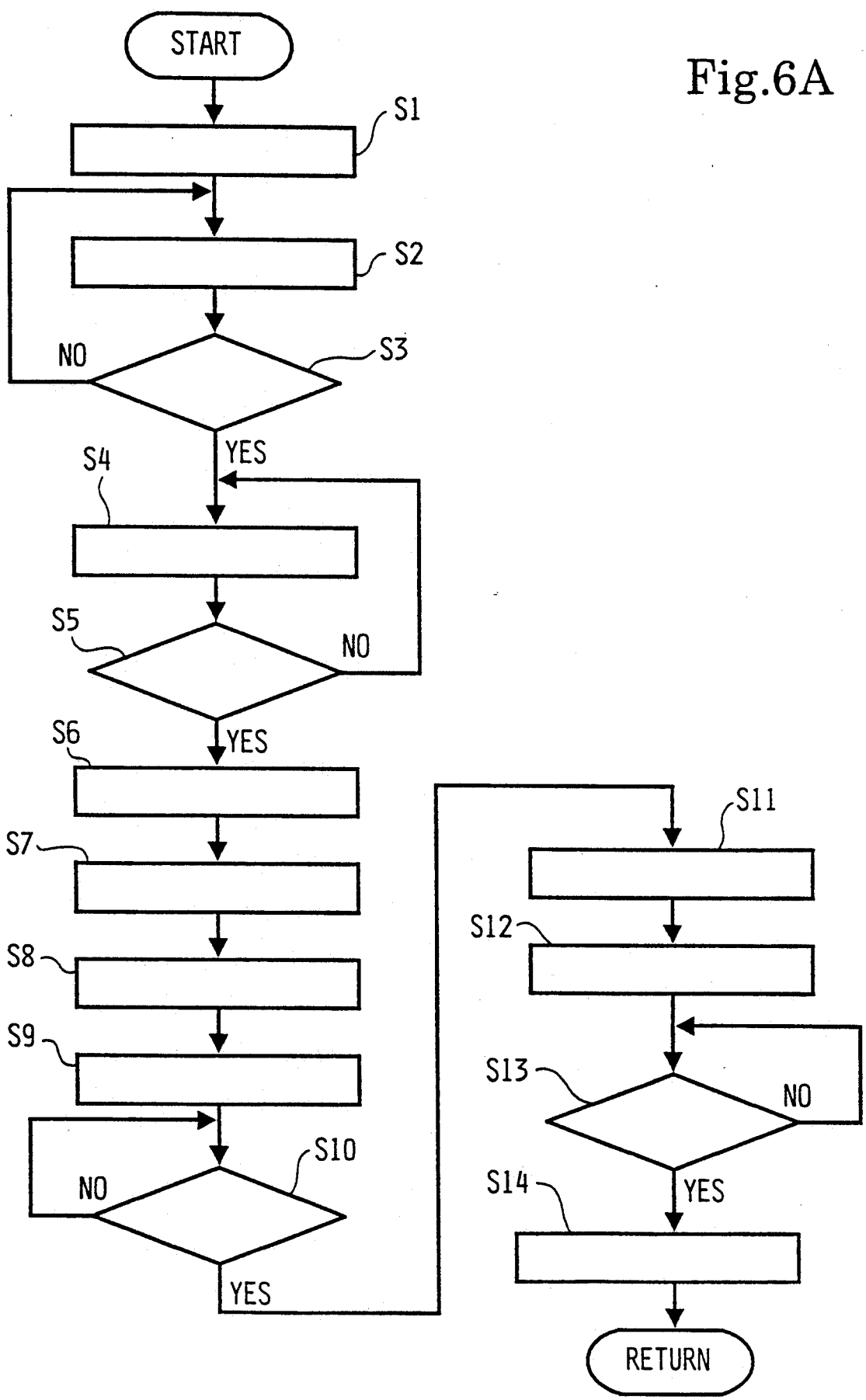
FIG. 6A is a flowchart of an operation for cutting off and disposing of the broken-down wire electrode.

Next, in the wire-cut electrical discharge machine having the above-described structure, the operation for cutting off a predetermined length of the wire electrode 8 upon accidental rupture of the wire electrode 8 will be explained with reference to the flowchart of FIGS. 6A and 6B.

When a start button (not shown) is operated, an initialization is executed (S1) and the electrical discharge machining is executed (S2). At this time, the driving motor 20 applies the torque to the wire bobbin 9 such that the wire electrode 8 receives the pretension. Moreover, since the wire electrode 8 is detected by the sensor 39, a signal output from the sensor 39 is ON. While machining, the CPU 45 determines whether the wire electrode 8 has broken in the machining zone based on the output signal of the rotational sensor 22 which detects the rotational condition of the pulley 21 (S3).

When the wire electrode 8 breaks, the pulley 21 stops rotating for an instant. The rotational sensor 22 detects the non-rotation of the pulley 21 (S3: YES). At this time, the wire electrode 8 has a dangling pointed head thereof. Since the wire bobbin 9 is rotated in the direction indicated by an arrow A (FIG. 2) by the driving motor 20, the wire electrode 8 is then rewound onto the wire bobbin 9 (S4). Additionally, when the wire electrode 8 breaks, the current supplied to the driving motor 20 is decreased according to the decrease in duty. Therefore, the accidental rupture of the wire electrode 8 may be detected by monitoring for the decrease of the current. When the broken wire electrode 8 is detected, the operation for cutting and disposing of the wire electrode is started.

The CPU 45 determines whether the output signal of the sensor 39 for detecting the wire electrode 8 is OFF (S5). When the pointed head of the broken-down wire electrode 8 is positioned above the sensor 39, the output signal of the sensor 39 becomes OFF. As soon as the output signal of the sensor 39 is OFF (S5: YES), the driving motor 20 stops rotating (S6). The rotational third solenoid 41 is then excited (ON) (S7), as shown in FIG. 4, and the moving plate 25 is pivoted about the shaft 26 such that the lower opening of the lower guide 40 on the moving plate 25 faces to the disposal box 43.

Under this condition, the rotational first solenoid 31 is excited. As a result, the wire electrode 8 is held between the feeding roller 28 and the pinch roller 30. When the transmitting motor 29 is driven such that the feeding roller 28 is positively rotated, in the direction indicated by an arrow B shown in FIG. 4 (S8), the pointed head of the wire electrode 8 is fed toward the disposal box 43 and a timer, provided in the CPU 45, is started (S9). When the pointed head of the wire electrode 8 passes in front of the sensor 39, the output signal of the sensor 39 becomes ON.

The CPU 45 then determines whether a predetermined time, time period T1, has elapsed, that is, whether the value of the timer period timer exceeds the T1 as stored in the ROM 46 (S10). If the time period has not lapsed, the wire electrode 8 is continuously fed to the disposal box 43. When the time period T1 lapses, the pointed head of the wire electrode 8, which was detected by the sensor 39 in step S5, has been fed downward for a predetermined length. The predetermined length is set so as contain all unusable length of the wire electrode 8 which was ruptured by the accident or the electrical discharge machining. In the present embodiment, the time period is set such that the wire electrode 8 is fed about 100–120 mm with the time period necessary for such a feed being stored beforehand in the ROM 46.

When the CPU 45 determines that the time period T1 has elapsed (S10: YES), the transmitting motor 29 is stopped so that the wire electrode 8 is no longer fed (S11). Next, the linear second solenoid 38 is excited so that the predetermined length of the wire electrode 8 is cut off (S12). Since the lower opening of the lower wire guide 40 faces toward the disposal box 43, the scrap wire electrode 8 falls into the disposal box because of the dead weight thereof.

As described above, as soon as the wire electrode 8 is cut off, the scrap wire electrode 8 falls into the disposal box 43. After the operation for cutting and disposing of the wire electrode is completed, the wire electrode 8 is again not detected by the sensor 39 and the output signal of the sensor 39 becomes OFF. The CPU 45 determines that the output signal of the sensor 39 is OFF (S13: YES). Then, since the rotational third solenoid 41 is turned off, the moving plate 25 returns to its original position (S14).

At that time, the lower opening of the lower wire guide 40 faces to the cylindrical guide 44, and the wire electrode 8 having new pointed head thereof is fed into the processing passage. By the above-described operation, the unusable length of the wire electrode 8, that has been ruptured by the accident in the machining zone, is scrapped. Therefore, it becomes easy to automatically rethread the wire electrode 8, having a new pointed head, in the wire-cut electrical discharge machine.

It should be apparent that linear electronic solenoids can be used instead of the rotational first and third solenoids 31, 41. Moreover, a pair of welding electrodes may be used as the cutting means. In this case, the welding electrodes come in contact with the wire electrode and the wire electrode is cut off using joule heating.

Next, a second embodiment of the invention will be explained. Those portions of the second embodiment that are the same as the first embodiment are identified by identical reference numbers and the description of their operation is as described in the first embodiment.

Figure 7:
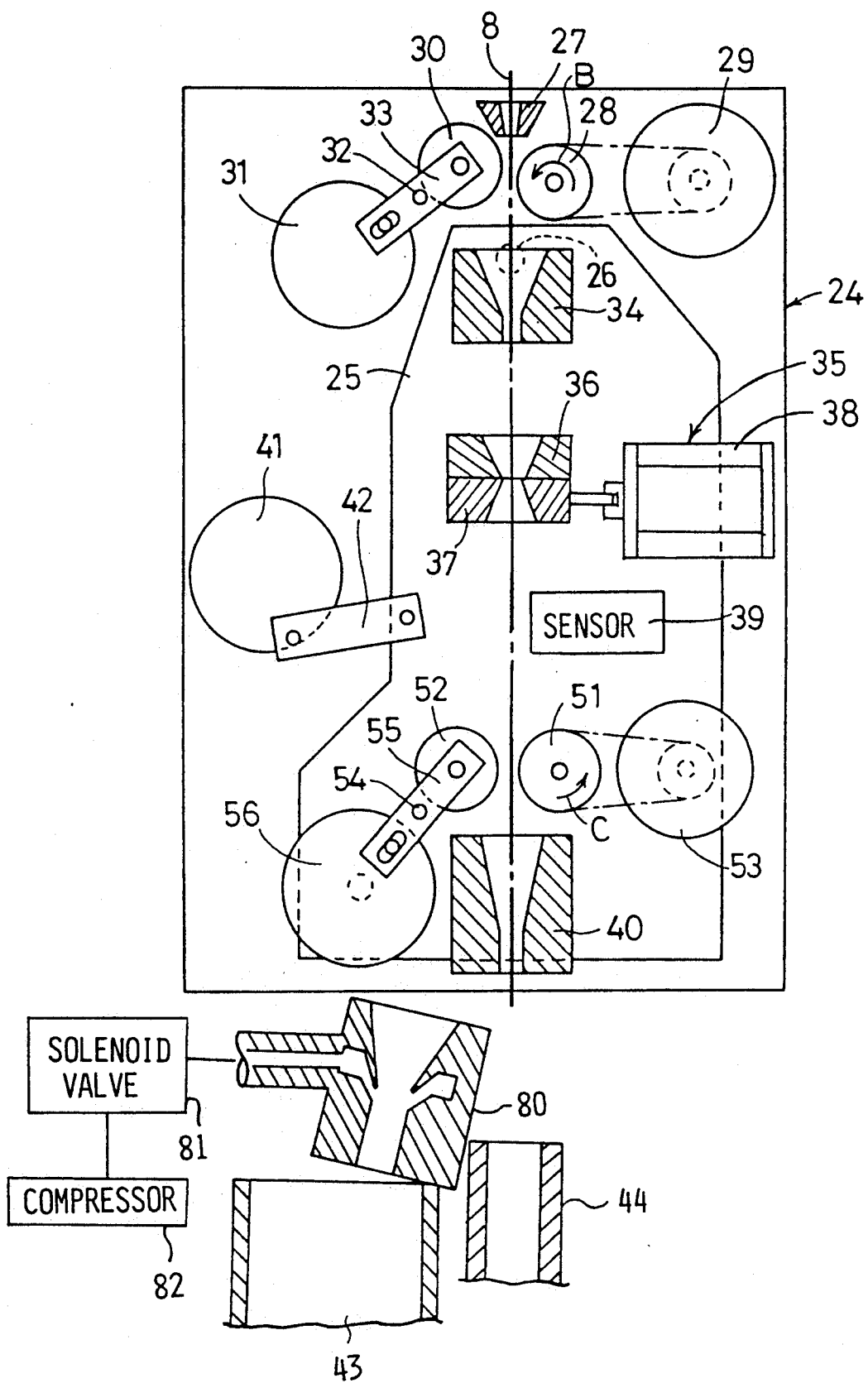
FIG. 7 is a main portion, partial sectional side view of the wire electrode cutting disposal portion of a second embodiment.

As shown in FIG. 7, a lower wire driving device is disposed on the moving plate 25 so as to be positioned between the cutting device and the sensor 39 in the second embodiment. The lower wire driving device comprises a feeding roller 51 which is rotated by a feeding motor 53, a step motor, and a pinch roller 52 which is connected to a rotational plate of a rotational solenoid 56 through a lever 55 which rotates about a supporting shaft 54. When the rotational solenoid 56 is excited, the pinch roller 52 is moved via the lever 55 to hold the wire electrode 8 with the feeding roller 51. At this time, the feeding roller 51 is rotated, in the direction of arrow C, by the feeding motor 53 and the wire electrode 8 is fed downward.

Further, an air blow device 80 is disposed above the disposal box 43. A compressor 82 is connected to the air blow device 80 through a solenoid valve 81. When the compressor 82 supplies the compressed air to the air blow device 80, the scrap wire electrode 8 is introduced into the disposal box 43 while swimming with the air stream. As shown in FIG. 5, the feeding motor 53, the fourth solenoid 56 and the solenoid valve 81 are connected to the driving circuit 48 so as to be controlled by the CPU 45.

Figure 8A:
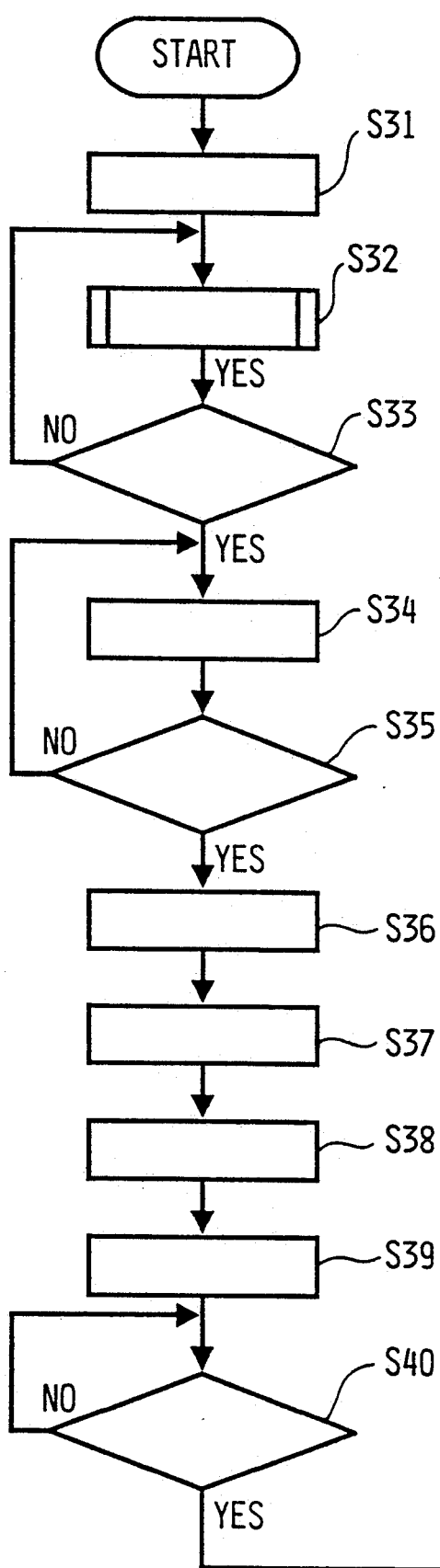
FIG. 8A is a flowchart of an operation for cutting off and disposing of the broken-down wire electrode in the second embodiment.
Figure 8A:
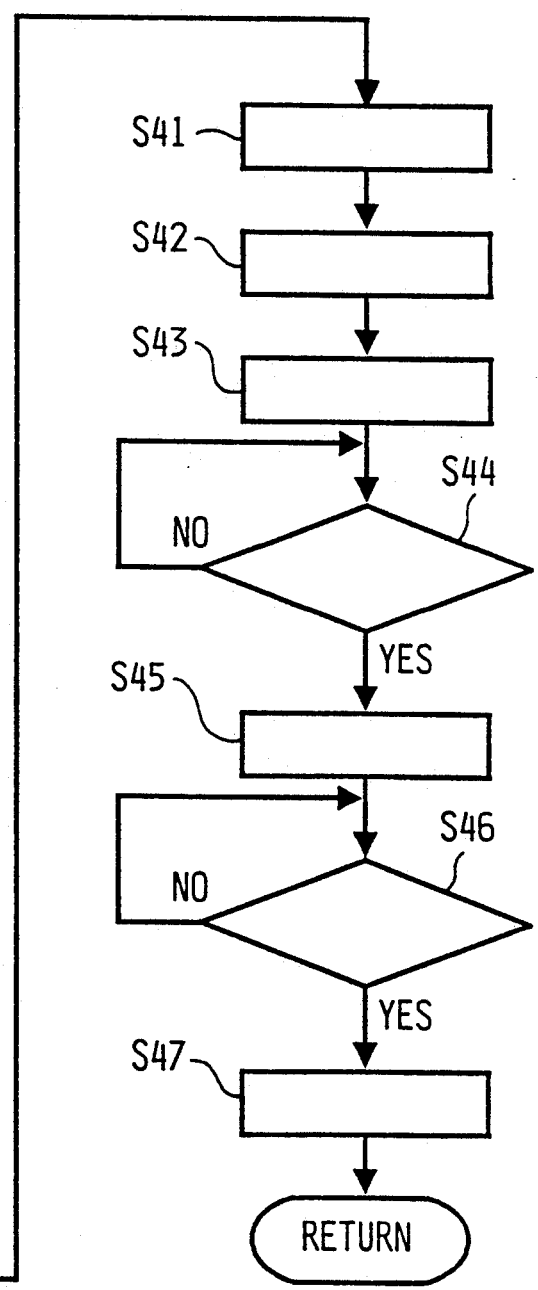

The control operation for the second embodiment will be explained with reference to the flowchart of FIGS. 8A and 8B. When the start button (not shown) is operated, the initialization is executed (S31) and the electrical discharge machining is started (S32). At this time, the driving motor 20 applies the torque to the wire bobbin 9 such that the wire electrode 8 receives the pretension. Moreover, since the wire electrode 8 is detected by the sensor 39, the signal output from the sensor 39 is ON. While machining, the CPU 45 determines whether the wire electrode 8 is broken in the machining zone based on the output signal of the rotational sensor 22 which detects the rotational condition of the pulley 21 (S33).

When the wire electrode 8 is broken, the pulley 21 stops rotating for an instant. The rotational sensor 22 detects the stopping of the pulley 21 (S33: YES). At this time, the wire electrode 8 has a dangling pointed head. Since the wire bobbin 9 is rotated in the direction indicated by the arrow A (FIG. 2) by the driving motor 20, the wire electrode 8 is rewound onto the wire bobbin 9 (S34). When the breakage of the wire electrode 8 is detected, the operation for cutting and disposing of the wire electrode is started.

The CPU 45 determines whether the output signal of the sensor 39 for detecting the wire electrode 8 is OFF (S35). When the pointed head of the broken-down wire electrode 8 is positioned above the sensor 39, the output signal of the sensor 39 becomes OFF. As soon as the output signal of the sensor 39 is OFF (S35: YES), the driving motor 20 stops rotating (S36). The rotational third solenoid 41 is excited (ON) (S37)) and the moving plate 25 is pivoted about the shaft 26 such that the lower opening of the lower guide 40 on the moving plate 25 faces the air blow 80.

At this time, the rotational first solenoid 31 is excited and the wire electrode 8 is held between the feeding roller 28 and the pinch roller 30. The transmitting motor 29 is then driven such that the feeding roller 28 is positively rotated in the direction indicated by an arrow B shown in FIG. 7 (S38), and the pointed head of the wire electrode 8 is fed toward the disposal box 43. A timer, provided in the CPU 45, is also started at this time (S39). When the pointed head of the wire electrode 8 passes in front of the sensor 39, the output signal of the sensor 39 becomes ON.

The CPU 45 determines whether a predetermined time, time period T1, has elapsed, that is, whether the value of the timer exceeds T1 as stored in the ROM 46 (S40). If the time period T1 has not elapsed, the wire electrode 8 is continuously fed to the disposal box 43. When the time period T1 lapses, the pointed head of the wire electrode 8, detected by the sensor 39 in S35, has been fed downward a predetermined length. When the CPU 45 determines that the time period T1 has elapsed (S40: YES), the transmitting motor 29 is stopped so that the wire electrode 8 is not fed (S41).

Under this condition, that is, when the wire electrode 8 is sandwiched between the feeding roller 28, which is no longer rotating, and the pinch roller 30, the fourth solenoid 56 is excited to further hold the wire electrode 8 between the feeding roller 51 and the pinch roller 52. Next, the feeding motor 53 is driven so that the feeding roller 51 is positively rotated in the direction indicated by the arrow C (FIG. 7) and tension is applied to the wire electrode (S42). Then, the second solenoid 38 is excited, so that the wire electrode 8 is cut off. The upper portion of the wire electrode 8 is held between the non-rotating feeding roller 28 and the pinch roller 30. Moreover, the lower portion of the wire electrode 8 is held between the feeding roller 51, which is rotating in the direction indicated by the arrow C (FIG. 7) and the pinch roller 52. As a result, the wire electrode is cut off by the cutting device 35 comprising the stationary knife 36 and the moving knife 37 while having tension applied thereto. Then, since the wire electrode 8 is smooth at the pointed head thereof, it is easy to guide the wire electrode 8 into the upper wire guide 62, the lower guide 63 and the starting position on the workpiece W.

When the solenoid valve 81 is turned on, the compressed air supplied from the compressor 82 is jetted from the air blow device 80 so that a suction force for the scrap wire electrode 8 occurs at the entrance of the air blow device 80 and a blowdown force occurs at the exit of the air blow device 80. Thus, the scrap wire electrode 8 is positively fed into the disposal box 43 by the feeding roller 51 and the pinch roller 52. When the feeding roller 51 and the pinch roller 52 can no longer hold the scrap wire electrode 8 therebetween, the scrap wire electrode 8 continues into the disposal box 43 under the influence of the suction force and the blowdown force of the air blow device 80. As a result, the scrap wire electrode 8 is discharged into the disposal box 43 with certainty.

When the scrap wire electrode 8 is fed downward by the feeding roller 51 and the pinch roller 52. The upper pointed head of the scrap wire electrode 8 will pass in front of the sensor 39 and the output signal of the sensor 39 becomes OFF (i.e., no wire electrode 8 detected) (S46). When the output signal of the sensor 39 becomes OFF, the timer provided in the CPU 45 is again started (S45). The CPU 45 then determines whether a time period T2 has elapsed, that is, whether the value of the timer exceeds the value of time period T2 stored in the ROM 46 (S46). The time period T2 is set so that the scrap wire electrode 8 that passed in front of the sensor 39 is completely discharged into the disposal box 43 during the time period T2.

When the time period T2 lapses (S46: YES), the first solenoid 31, the second solenoid 38 and the fourth solenoid 56 are turned off, and the feeding motor 53 is stopped. As a result, the passage above the wire guide 40 is opened. Next, the third solenoid 41 is turned off and the moving plate 25 returns to its original position (S47). At this time, the lower opening of the lower wire guide 40 faces to the cylindrical guide 44 and a normal feeding of the lead pointed head of wire electrode 8 may commence.

Although the invention has been described in specific terms, alterations and deviations within the scope of the invention would be obvious to one skilled in the art, such as the use of a motor that can rotate positively and negatively as the moving means for selectively moving the moving plate 25 instead of the rotational third solenoid 41.

Moreover, in the above-mentioned embodiments, the lower wire guide 40 and the cutting device is disposed on the moving plate 25 so as to move integrally. However, a lower wire guide may be used which moves independently to be above the processing passage when the wire electrode 8 passes through the workpiece W while machining or above the disposal passage when the scrap wire electrode 8 is fed to the disposal portion.

What is claimed is:

1. A wire-cut electrical discharge machine, comprising:
   a fixed frame;
   a moving plate pivotally mounted to said fixed frame;
   a wire guide mounted on said moving plate and disposed between a supply of the wire electrode and a workpiece, the wire guide introducing the wire electrode into a processing passage in which the wire electrode moves toward the workpiece;
   a cutting means disposed between the supply of the wire electrode and the workpiece for cutting off the unusable length of the wire electrode;
   a disposal portion for storing a scrap wire electrode which is cut off by the cutting means; and
   a moving means for pivotally moving the moving plate so as to selectively position the wire guide in line with one of the processing passage and a disposal passage through which the scrap wire electrode moves to the disposal portion.

2. A method for cutting a wire electrode of an electrical discharge cutting machine, comprising the steps of:
   determining a breakage in the wire electrode;
   rewinding the wire electrode toward a supply spool;
   detecting when a broken end of the wire electrode has passed a predetermined point;
   stopping rewinding of the wire electrode;
   positioning a feed path of the wire electrode to be aligned with a disposal portion by displacement of a moving plate having a wire guide mounted thereon;
   feeding the wire electrode to a cutting position; and
   cutting off a damage portion of the wire electrode.

3. The method as claimed in claim 2, wherein the step of feeding the wire electrode continues for a predetermined period of time.

4. The method as claimed in claim 2, further comprising the steps of:
   repositioning the feed path of the wire electrode to be aligned with a workpiece cutting feed path by the displacement of said moving plate; and
   then feeding the wire electrode to a workpiece cutting area.

5. The method as claimed in claim 3, further comprising the steps of:
   driving a second feeding element positioned downstream of the cutting position prior to said cutting off step; and
   detecting the cutting of the wire electrode.

6. The method as claimed in claim 5, wherein the step of driving the second feeding element continues driving for a second predetermined period of time after detecting the cutting of the wire electrode.

7. The method as claimed in claim 6, further comprising the steps of:
   repositioning the feed path of the wire electrode to be aligned with a workpiece cutting feed path by the displacement of said moving plate; and
   then feeding the wire electrode to a workpiece cutting area.

8. The method as claimed in claim 5, further comprising the step of drawing the damaged portion of the wire electrode into the disposal portion.

9. An apparatus for cutting a wire electrode of an electrical discharge cutting machine, comprising:

means for determining a breakage in the wire electrode;

means for rewinding the wire electrode toward a supply spool;

means for detecting when a broken end of the wire electrode has passed a predetermined point;

means for stopping rewinding of the wire electrode;

means for positioning a feed path of the wire electrode to be aligned with a disposal portion by displacement of a moving plate having a wire guide mounted thereon;

means for feeding the wire electrode to a cutting position; and means for cutting off a damaged portion of the wire electrode.

10. The apparatus as claimed in claim 9, wherein the means for feeding the wire electrode continues feeding for a predetermined period of time.

11. The apparatus as claimed in claim 9, further comprising:

means for repositioning the feed path of the wire electrode to be aligned with a workpiece cutting feed path by displacement of said moving plate; and means for then feeding the wire electrode to a workpiece cutting area.

12. The apparatus as claimed in claim 10, further comprising:

means for driving a second feeding element positioned downstream of the cutting position prior to said cutting off of the damaged portion; and means for detecting the cutting of the wire electrode.

13. The apparatus as claimed in claim 12, wherein the means for driving the second feeding element continues driving for a second predetermined period of time after detecting the cutting of the wire electrode.

14. The apparatus as claimed in claim 12, further comprising means for drawing the damaged portion of the wire electrode into the disposal portion.

15. The apparatus as claimed in claim 13, further comprising:

means for repositioning the feed path of the wire electrode to be aligned with a workpiece cutting feed path by the displacement of said moving plate; and means for then feeding the wire electrode to a workpiece cutting area.

16. An apparatus for cutting a wire electrode of an electrical discharge cutting machine, comprising:

a fixed frame;

an upstream wire guide mounted to said fixed frame;

a moving plate pivotally mounted to said fixed frame;

first feeding means mounted to said fixed frame between said upstream wire guide and said moving plate for engaging and feeding the wire electrode;

cutting means mounted on said moving plate for cutting the wire electrode;

a sensor mounted to said moving plate downstream, in the direction of wire electrode feed, of said cutting means;

downstream wire guide means mounted to said moving plate for guiding the wire electrode; and moving means for pivotally moving said moving plate to position said downstream wire guide over one of a wire disposal portion and a feed passage to a workpiece cutting area.

17. The apparatus as claimed in claim 16, further comprising a control means for controlling operation of the apparatus to cut off a damaged portion of a wire electrode.

18. The apparatus as claimed in claim 17, further comprising second feeding means positioned on said moving plate between said cutting means and said downstream wire guide means.

19. The apparatus of claim 18, further comprising an air blow device between said downstream wire guide means and the disposal portion.

20. The apparatus as claimed in claim 16, wherein said cutting means comprises:

a stationary cutting blade;

a moving cutting blade; and means for moving said moving cutting blade to cut the wire electrode by the shear effect produced between an edge of said stationary cutting blade and an edge of said moving cutting blade.

21. A wire-cut electrical discharge machine comprising:

a fixed frame;

a moving plate movably mounted to said fixed frame;

a wire guide mounted on said moving plate and disposed between a supply of the wire electrode and a workpiece, the wire guide introducing the wire electrode into a processing passage in which the wire electrode moves toward the workpiece;

a cutting means disposed between the supply of the wire electrode and the workpiece for cutting off the unusable length of the wire electrode;

a disposal portion for storing a scrap wire electrode which is cut off by the cutting means; and a moving means for moving the moving plate so as to selectively position the wire guide in line with one of the processing passage and a disposal passage through which the scrap wire electrode moves to the disposal portion.

* * * * *